3,511,690
PRODUCTION OF POLYTETRAFLUOROETHYLENE-CONTAINING COATINGS ON METALLIC BASES
Shaul M. Aharoni, Eau Claire, Wis., assignor to National Presto Industries, Inc., Eau Claire, Wis., a corporation of Wisconsin
No Drawing. Filed June 5, 1967, Ser. No. 643,393
Int. Cl. B44d 1/14; B65d 25/14
U.S. Cl. 117—71             8 Claims

ABSTRACT OF THE DISCLOSURE

A process for the co-deposition of polytetrafluoroethylene and mixtures of metal powders with anhydrous metal oxides or metal carbide powders on metallic surfaces.

---

This invention relates to the production of improved polytetrafluoroethylene-containing coatings on metallic bases, such as cooking vessels and the like.

The application of polytetrafluoroethylene resin to a "metalized" surface, e.g., an aluminum surface on which a thin layer of aluminum powder and aluminum oxide powder are flame-sprayed, results in a surface coating which, though it has many desirable attributes, also has undesirably low abrasion and scratch resistance.

The present invention which provides a method for improving the abrasion resistance and scratch resistance of polytetrafluoroethylene coatings applied to a metal base, is accomplished in accordance with the following procedure.

The base which is to be treated in accordance with my invention and which can be aluminum, aluminum alloy, steel, iron, copper, brass, or other metals or alloys, is first cleaned and prepared for subsequent treatment, by blasting as with grit, sand or oxide, or by etching in an appropriate acid or alkaline solution followed by neutralization if needed, and then by rinsing and drying.

There is then applied to the base a coating of a composition which I shall refer to for convenience as "Composition A." After the coating of "Composition A" has been dried and baked, I apply thereover a coating of polytetrafluoroethylene resin, and dry and bake that, all as described hereinafter.

A representative formulation for "Composition A" comprises the following in parts by volume:

| | Parts |
|---|---|
| Aluminum powder, non-spherical particles having average particle size of about 20–12 microns | 45 |
| Aluminum oxide powder, having particle size not larger than 10 microns | 55 |
| Dispersion of polytetrafluoroethylene resin (50% by weight) in water | 100 |

The viscosity of the above composition is adjusted as may be needed so that it is suitable for application of the composition by spraying, as those skilled in the art will understand.

The foregoing composition is sprayed onto the metal base, air dried at room temperature and then baked at about 600–800° F. for anywhere from about 5 to 30 minutes—the resulting layer being about 1 mil thick.

After the above-coated product has cooled it is coated again, this time with a dispersion of polytetrafluoroethylene resin (50% by weight) in water, and is air dried and then baked as above described. This second layer is about 0.4 mil thick.

In place of the aluminum powder used in "Composition A," I can substitute therefor other metals such as, for example, iron, steel, copper, brass, chromium or nickel, in parts by volume ranging from about 45 to 55.

The aluminum oxide component of "Composition A" can be replaced by either the oxides, carbides, or mixtures thereof, of silicon and of metals such as, for example, aluminum, titanium, zirconium, chromium and nickel.

The polytetrafluoroethylene resin used in "Composition A" as well as for the second coat can be a dispersion, emulsion or solution of the resin in either water or in an organic liquid, and is available commercially in either form. If in the form of a dispersion in organic liquid, the resin content is generally around 25% by weight. In adjusting the viscosity of the latter, a compatible organic liquid such as, for example, xylene, toluene or chlorothene, is used for thinning.

I have found that the most desirable proportions of the components of "Composition A" are in the range of about 50–60 volumes of metal oxide powder to about 50–40 volumes of metal powder, the two together making up 100 volumes, mixed with 100 volumes of polytetrafluoroethylene emulsion, said emulsion containing about 50 percent by weight of solid polytetrafluoroethylene resin.

The adhesion of my composite coatings to the metallic substrate will be found to be exceedingly strong, and highly resistant to abrasion and scratching, compared to metallized coatings, and to exhibit thermal conductivity approximately equal to that of unmodified polytetrafluoroethylene resin coatings. A further advantage is that with my coated products the phenomenon known as "mud-cracking" does not appear, in layers of 2.0 mils or less in thickness, compared with that evidenced when only polytetrafluoroethylene resins per se are used in the coating.

It will be understood that various changes may be made in the invention without departing from the spirit thereof, and it is therefore not intended that the disclosed details of the invention shall be construed as limitations in the scope thereof, except as included in the following claims.

I claim:

1. A process for producing on a metallic base a surface which is characterized by a high degree of abrasion resistance, scratch resistance, and resistance to sticking which comprises applying on said base a first layer comprising a mixture of a dispersion of polytetrafluoroethylene, finely divided nonspherical particles of a metal selected from the group consisting of aluminum, iron, steel, copper, brass, chromium and nickel and finely divided particles of a member selected from the group consisting of oxides and carbides of aluminum, titanium, zirconium, silicon, chromium and nickel, and mixtures thereof, drying and baking the thus applied layer, applying thereover a second layer consisting essentially of a dispersion of polytetrafluoroethylene, and drying and baking the said second applied layer.

2. The process of claim 1 wherein the said nonspherical particles of metal have an average size of about 20–12 microns.

3. The process of claim 1 wherein the said metal is aluminum.

4. The process of claim 1 wherein the said metal oxide is aluminum oxide.

5. The process of claim 1 wherein the said first layer is formed by baking on the said metallic base a mixture comprising 50–60 volumes of aluminum oxide powder, 50–40 volumes of aluminum powder, the two together making up 100 volumes, and 100 volumes of polytetrafluoroethylene emulsion that contains 50 percent by weight of solid polytetrafluoroethylene resin.

6. The process of claim 1 wherein the said first layer is about 1 mil in thickness.

7. The process of claim 1 wherein the said second layer is about 0.4 mil in thickness.

8. A cooking vessel having a metallic base, and a surface portion which is characterized by a high degree of abrasion resistance, scratch resistance and resistance to sticking thereto of foods in contact therewith during cooking, said surface being formed of a first layer comprising polytetrafluoroethylene, finely divided non-spherical particles of a metal selected from the group consisting of aluminum, iron, steel, copper, brass, chromium and nickel and finely divided particles of a member selected from the group consisting of oxides and carbides of aluminum, titanium, zirconium, silicon, chromium and nickel, and mixtures thereof, and a second layer consisting essentially of polytetrafluoroethylene resin, the said first layer having been dried and then baked, and the second layer having then been applied, dried and baked.

References Cited

UNITED STATES PATENTS

| | | | |
|---|---|---|---|
| 3,234,038 | 2/1966 | Stephens et al. | 117—75 X |
| 3,243,321 | 3/1966 | Rowland | 117—132 X |
| 3,360,391 | 12/1967 | Richtzenhain et al. | 117—75 X |
| 3,377,193 | 4/1968 | Stilmar | 117—132 X |

ALFRED L. LEAVITT, Primary Examiner

CAMERON K. WEIFFENBACH, Assistant Examiner

U.S. Cl. X.R.

117—75, 132; 220—64